(12) United States Patent
Barsness

(10) Patent No.: US 7,562,116 B2
(45) Date of Patent: *Jul. 14, 2009

(54) APPARATUS FOR DETERMINING AVAILABILITY OF A USER OF AN INSTANT MESSAGING APPLICATION

(75) Inventor: Eric Lawrence Barsness, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/940,605

(22) Filed: Nov. 15, 2007

(65) Prior Publication Data

US 2008/0082620 A1    Apr. 3, 2008

Related U.S. Application Data

(60) Continuation of application No. 10/720,878, filed on Nov. 24, 2003, now Pat. No. 7,337,210, which is a division of application No. 09/482,452, filed on Jan. 13, 2000, now abandoned.

(51) Int. Cl.
*G06F 13/00* (2006.01)
(52) U.S. Cl. ..................................... 709/204
(58) Field of Classification Search ................. 709/204
See application file for complete search history.

(56) References Cited

U.S. PATENT DOCUMENTS 5,842,009 A    11/1998  Borovov et al.
6,009,455 A    12/1999  Doyle
6,094,681 A    7/2000   Shaffer et al.
6,347,339 B1   2/2002   Morris et al.
6,359,557 B2   3/2002   Bilder
6,369,840 B1   4/2002   Barnett et al.
6,380,959 B1   4/2002   Wang et al.
6,807,423 B1   10/2004  Armstrong et al.

OTHER PUBLICATIONS

Bergvik et al., "User Experiences of a Work Group Awareness Information Provided By a Buddy List Application", Aug. 3, 1999, ISBN 82-423-0492-0.

ICQ Inc., "A Guided Tour to ICQ", published on the World Wide Web at http://www.icq.com/icqtour, date of publication unknown. (Selected pages printed Jan. 3, 2000).

*Primary Examiner*—Robert B Harrell
(74) *Attorney, Agent, or Firm*—Roy W. Truelson

(57) ABSTRACT

An instant messaging application intelligently infers a user's unavailability from one or more indicia which include the user's electronic calendar. Preferably, the instant messaging application may report not only that a user is unavailable, but also give a reason for inferring unavailability, in order to provide other users with additional potentially useful information. Preferably, the user may specify which indicia and which parameters may be used to infer his unavailability in an editable profile. When another user requests status, this value is returned by the server. An intelligent instant messaging application as described herein provides other users with more accurate and complete availability information.

8 Claims, 11 Drawing Sheets

APPARATUS FOR DETERMINING AVAILABILITY OF A USER OF AN INSTANT MESSAGING APPLICATION

CROSS REFERENCE TO RELATED APPLICATIONS

This is a continuation of pending U.S. patent application Ser. No. 10/720,878, filed Nov. 24, 2003, entitled "Method and Apparatus for Determining Availability of a User of an Instant Messaging Application" (as amended), which is a divisional application of U.S. patent application Ser. No. 09/482,452, filed Jan. 13, 2000, entitled "Method and Apparatus for Managing Instant Messaging", now abandoned, both of which are herein incorporated by reference. This application claims priority under 35 U.S.C. §120 of U.S. patent application Ser. No. 10/720,878, filed Nov. 24, 2003 and U.S. patent application Ser. No. 09/482,452, filed Jan. 13, 2000.

FIELD OF THE INVENTION

The present invention relates to digital data processing, and in particular, to so-called instant messaging applications among multiple users connected to a computer network.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The cost of information processing not only includes the cost of computer hardware and software, but perhaps even more significantly, the cost of human resources devoted to gathering and processing information using computer systems. Improvements to the usability of computer hardware and software reduce the cost of human resources associated with information processing, either by reducing the amount of time directly devoted to a particular task by a human operator (user), or by reducing the level of training required of a user in order to achieve proficiency in performing the task. Continued progress of the information revolution requires still further improvements to the usability of computer systems.

Today, most computers are not isolated, but are connected to some type of network or networks which allow them to share information with other computer systems. This is also a logical consequence of the information revolution, for information is most useful when it is shared. The Internet is but one example of a computer network. Many computers used in commercial business environments are connected via local area networks or other means to other computers used by the same business enterprise, so that fellow workers may communicate with each other. In many environments, this is an essential part of their respective jobs.

Instant messaging is a type of computer application which is designed to facilitate communication among multiple computer users attached to a network, such as the Internet. Instant messaging may be implemented in various ways, but in general it supports the sending and receiving of instant messages to and from other users. Instant messages are messages which appear on the computer display of the recipient more or less instantly after being sent, subject only to transmission delays, processing delays, and the like, as opposed to more traditional e-mail messages, which typically are logged until the recipient wishes to view them. This characteristic gives instant messaging a more spontaneous, conversational quality than traditional e-mail, and thus helps to provide an alternative form of communication using computers attached to a network. Such applications may be used by a variety of users, from groups of individuals working closely together on some critical project, to more casual users at home who simply want to see who is available to receive a message immediately.

One of the functions typically provided by instant messaging applications is to inform the user whether selected other users are currently available to receive instant messages (or, for that matter, available to receive more traditional communications, such as telephone calls). Typically, each user maintains a list of other users with whom to exchange instant messages. In general, instant messaging applications check whether a user on the list is logged on (connected) to the network, and if so, the user is deemed to be at his workstation, available to receive instant messages. This simple logic may be sufficient in some circumstances, e.g., where the user is connected from home via a modem, and will usually disconnect (log off) when finished using the computer. But in a business environment, this assumption is frequently inaccurate. Many business computers are connected to their respective networks when the user is not present at the computer. It is common practice to log on in the morning, remain logged on all day, and log off on leaving for the day. During that time, the user may be in meetings, at lunch, or otherwise unavailable. It is even common practice to remain logged on after leaving for the day.

Some instant messaging applications allow a user to manually set his status as "unavailable" notwithstanding the fact that he is logged on, but users frequently forget to set status, or don't know about this option, or find it too bothersome to use. Additionally, it is known to report that the user is unavailable if the workstation is in a locked state, or there has been no input for a predetermined amount of time. However, these methods still have problems with accuracy, and fail to provide much useful information. An unrecognized need exists for a more automatic method for determining whether the user is available, which will predict availability with greater accuracy than current methods, and provide a greater amount of useful information to others concerning a user's availability.

SUMMARY OF THE INVENTION

In accordance with the present invention, an instant messaging application in a computer system attached to a network intelligently infers a user's unavailability from one or more indicia other than merely being logged on or active/inactive, and reports status accordingly. Specifically, availability may be inferred from the user's calendar data, which is preferably obtained from an electronic calendar application.

In the preferred embodiment, the instant messaging application may report not only that a user is unavailable, but also give a reason for inferring unavailability. Offering a reason provides other users with additional potentially useful information, such as an indication of the degree of certainty of the inference of unavailability, or when a user might again become available.

In the preferred embodiment, an editable profile file is associated with the instant messaging application. The user may edit the profile to specify which indicia may be used to infer his unavailability, and may specify certain parameters which may be used with the indicia, such as a length of time the user's workstation has been inactive before unavailability will be inferred. Any or all of the following indicia may be specified: (a) the user's calendar data indicates that the user is unavailable due to a specific event (e.g., in a meeting); (b) the time of day or day of week is outside the user's normal work schedule; (c) the user's workstation has been inactive for a predetermined period of time; and (d) the user's workstation is in a locked state. The profile is initialized with default values believed to reflect the preferences of an average user.

In the preferred embodiment, the instant messaging application periodically checks the user's status and stores the result in a field in memory. Any change in status is reported to an instant messaging server attached to the network. When another user requests status, this value is returned by the server. Alternatively, the instant messaging application may check status on demand of another user.

An intelligent instant messaging application as described herein provides other users with more accurate and more complete availability information, and frees each individual of the need to update his availability status each time he enters or leaves the office.

The details of the present invention, both as to its structure and operation, can best be understood in reference to the accompanying drawings, in which like reference numerals refer to like parts, and in which:

BRIEF DESCRIPTION OF THE DRAWING

FIGS. 8A-1 and 8A-2 (herein collectively referred to as FIG. 8A) and FIG. 8B are flowcharts showing in greater detail the steps taken by instant messaging software to determine availability status, according to the preferred embodiment.

DETAILED DESCRIPTION OF THE PREFERRED EMBODIMENT

Overview

Figure 1:
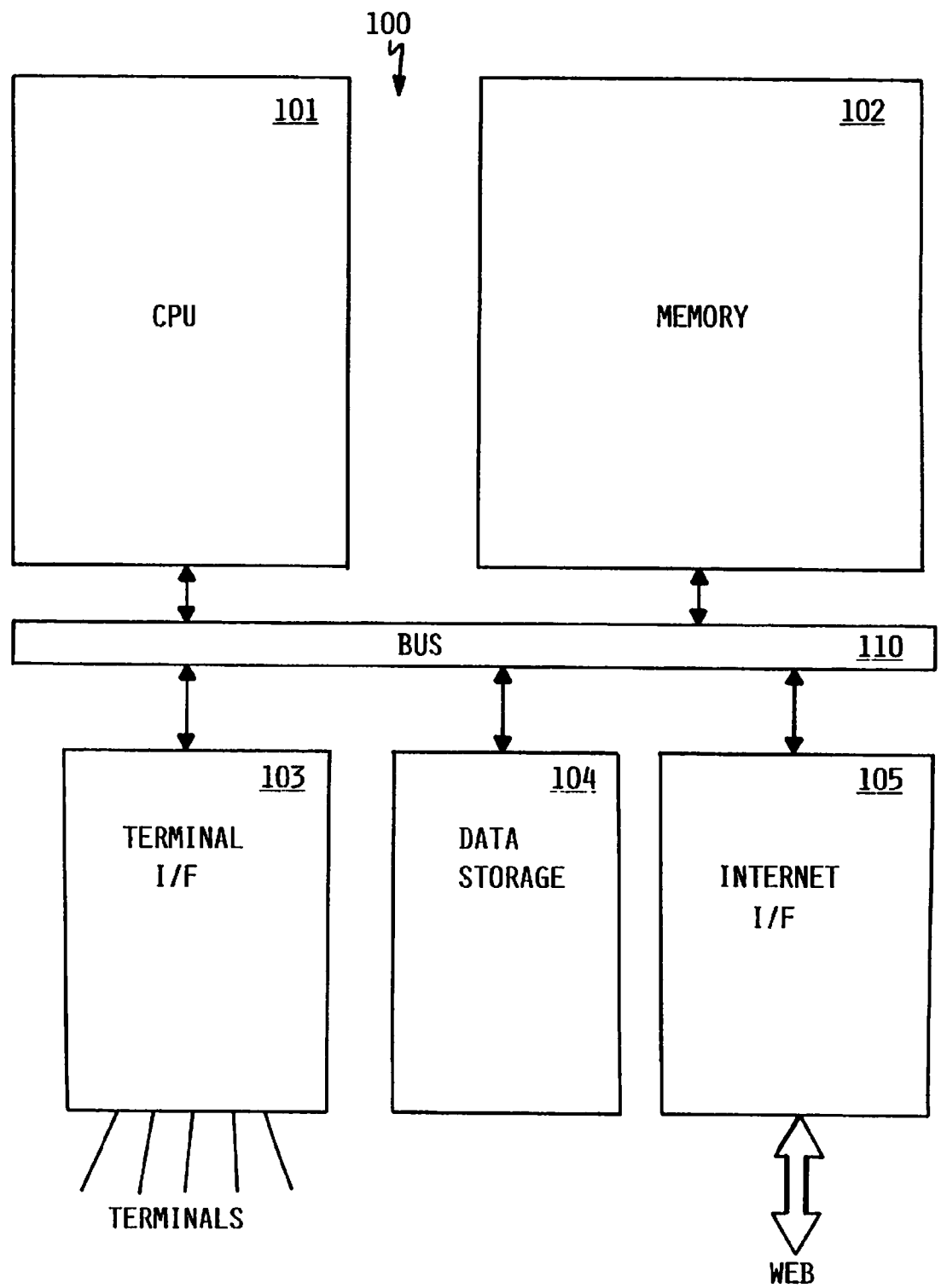
FIG. 1 is a high-level block diagram of a server computer system, according to the preferred embodiment of the present invention.

Prior to discussing the operation of embodiments of the invention, a brief overview discussion of the Internet is provided herein.

The term "Internet" is a shortened version of "Internetwork", and refers commonly to a collection of computer networks that utilize the TCP/IP suite of protocols, well-known in the art of computer networking. TCP/IP is an acronym for "Transport Control Protocol/Internet Protocol", a software protocol that facilitates communications between computers.

Networked systems typically follow a client server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the server itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered, electronic information to the user as server response to the client process. The client process may be active in a first computer system, and the server process may be active in a second computer system; the processes communicate with one another over a communications medium that allows multiple clients to take advantage of the information gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW), or simply, the "web", includes all servers adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office. The URL specifies a hypertext transfer protocol ("http") and a name ("www.uspto.gov") of the server. The server name is associated with a unique, numeric value (i.e., a TCP/IP address). The URL also specifies the name of the file that contains the text ("intro.html") and the hierarchical directory ("web") and subdirectory ("menu") structure in which the file resides on the server.

Individual users attached to the Internet may communicate with one another by sending electronic mail to a mail address. A mail address is typically of the form user_name@mail_server_name, where mail_server_name specifies the name of a mail server for the user, and user_name is the name of the user known to the mail server. Messages thus addressed are routed to the specified mail server. The mail server typically stores the messages until retrieved by the intended recipient.

Active within the client is a first process, known as a "browser, that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, chat-rooms, and video objects. A web page can be constructed by loading one or more separate files into an active directory or file structure that is then displayed as a viewable object within a graphical user interface.

When used on the Internet, instant messaging is a special-purpose application, which may execute as one of the functions of the browser, or may be a separate application. The instant messaging function in the client communicates with an instant messaging server. The server maintains physical link information for instant messaging users currently logged on to the Internet, and routes any instant messages received from a client to the intended recipient clients, without waiting for the recipients to retrieve messages (as in the traditional e-mail application). The server may also provide information concerning who is logged on at the request of a client.

Detailed Description

Referring to the Drawing, wherein like numbers denote like parts throughout the several views, FIG. 1 shows a high-level block diagram of a server computer system 100 acting as an instant messaging server, consistent with the preferred embodiment. Computer system 100 comprises central processing unit (CPU) 101, main memory 102, terminal interface 103, data storage 104, and internet interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Terminal interface 103 may support the attachment of a single or multiple terminals, and may be implemented as one or multiple electronic circuit cards or other units. Data storage 104 preferably comprises one or more rotating magnetic hard disk drive units, although other types of data storage could be used. Internet interface 105 provides a physical connection for transmission of data to and from the Internet, and could use any of various available technologies. Communications bus 110 supports transfer of data, commands and other information between different devices; while shown in simplified form as a single bus, it is typically structured as multiple buses, and may be arranged in a hierarchical form. The computer system shown in FIG. 1 is intended to be a simplified representation, it being understood that many variations in system configuration are possible in addition to those specifically mentioned here. While system 100 could be a personal computer system, an Internet instant messaging server could also be supported on a larger computer system such as an IBM Enterprise System or an IBM AS/400 system.

Figure 2:
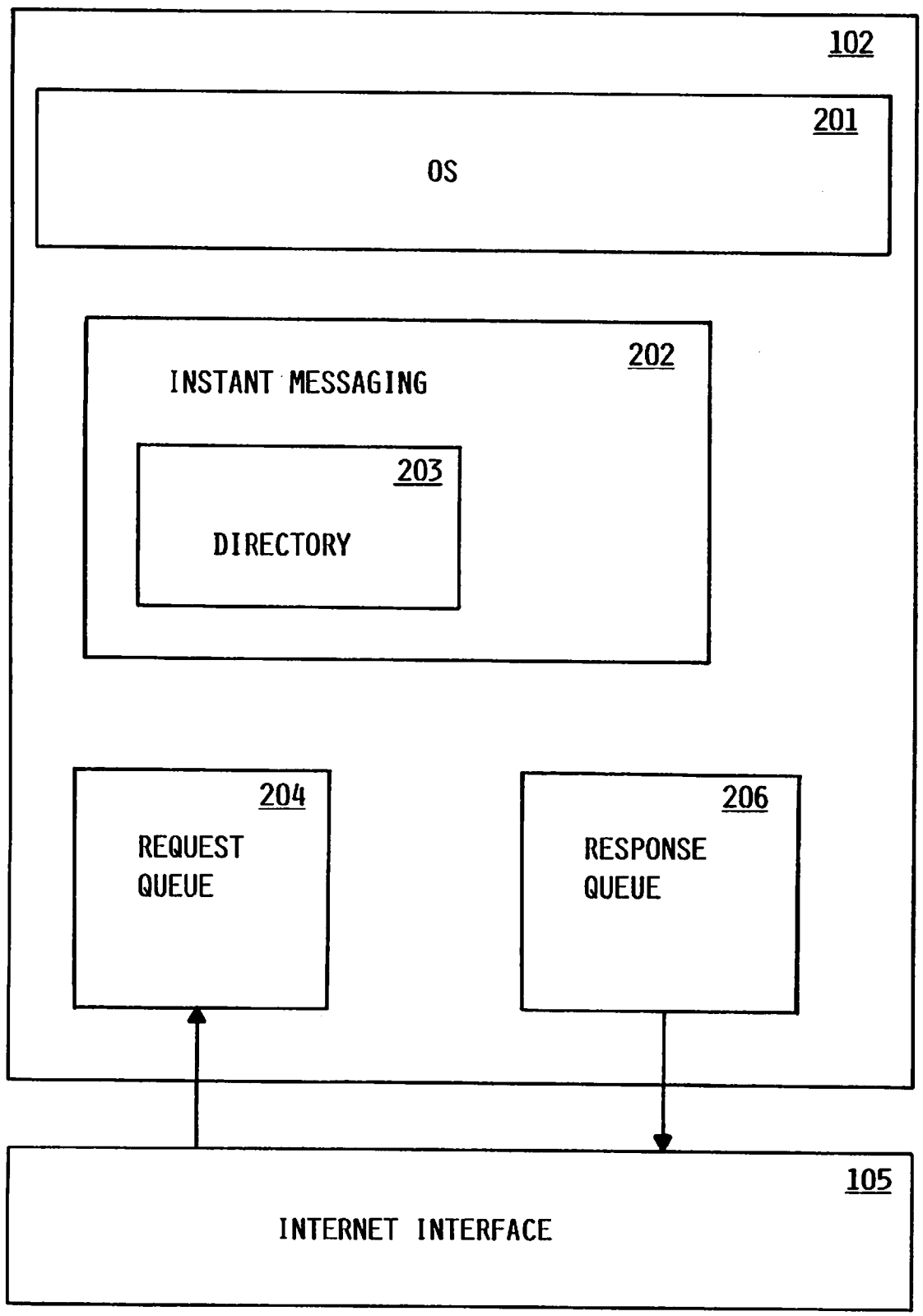
FIG. 2 is a conceptual illustration of the major software components of a server computer system for servicing instant messaging on the Internet, in accordance with the preferred embodiment.

FIG. 2 is a conceptual illustration of the major software components of server system 100 in memory 102. Operating system 201 provides various low-level software functions, such as device interfaces, management of memory pages, management of multiple tasks, etc. as is well-known in the art. Instant message server application 202 receives and transmits instant messages or responds to other instant message related service requests. Messaging application 202 maintains a directory 203 of users. Directory 203 contains information needed to identify a physical connection to a user from a logical user designation, such as an e-mail address. Directory 203 further contains information such as whether the user is currently logged on to the network, whether the user is currently "available" to receive instant messages, and status information further describing the state of the user's availability, as more fully described herein.

Request queue 204 temporarily stores requests received over the Internet from various clients. A "request" is simply a request that the server do something. In the case of an instant messaging application, many of the "requests" will be messages which the requester asks the server to propagate to some other workstation. However, a request may also be a request for information, such as information about the availability of other users, or simply a request that the server update its availability information regarding the requester. Depending on the server configuration, it is possible that many different types of requests are received and serviced, not all of which are related to instant messaging. On the other hand, computer system 100 may be a dedicated instant messaging server which does nothing but handle such messages. Messaging application 202 generates responses to requests on request queue 204, and places these on response queue 206, from which they are transmitted by interface 105 over the Internet.

While the software components of FIG. 2 are shown conceptually as residing in memory, it will be understood that in general the memory of a computer system will be too small to hold all programs and data simultaneously, and that information is typically stored in data storage 104, comprising one or more mass storage devices such as rotating magnetic disk drives, and that the information is paged into memory by the operating system as required.

Server computer 100 and its components are shown and described in FIGS. 1 and 2 as a more or less single, self-contained computer system. It is possible to implement a web server in such a manner. It is alternatively possible to use multiple computer systems, particularly multiple systems which share a single large database, each having a specialized task. For example, one or more computer systems could be dedicated to database maintenance, while one or more other computer systems are dedicated to servicing requests received from clients. References herein to a "server" or "instant messaging server" should be understood to include either a single computer or a collection of computer systems which provide instant messaging function.

Figure 3:
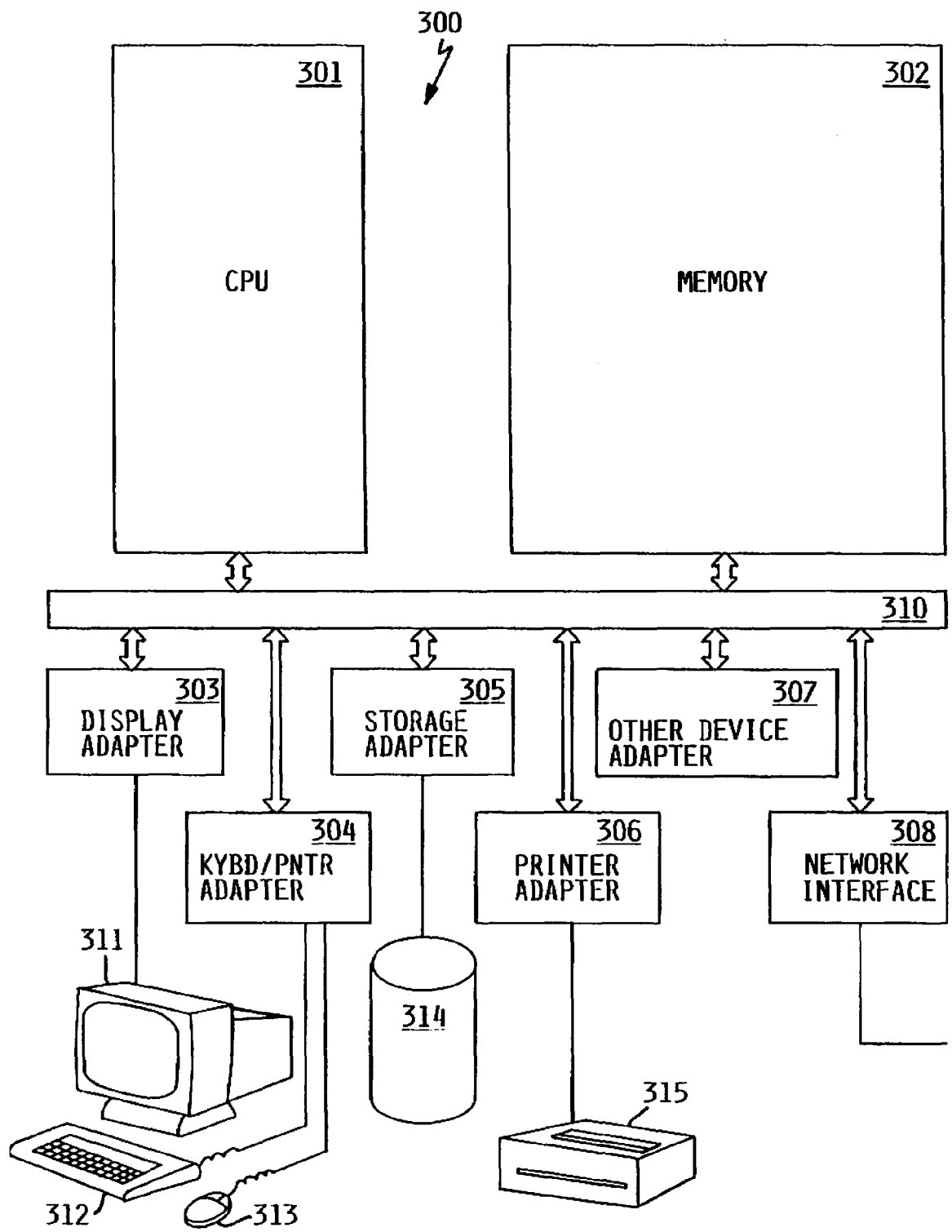
FIG. 3 is a high-level block diagram of a typical client workstation computer system from which an instant messaging application is run, according to the preferred embodiment.

FIG. 3 illustrates a typical client computer system 300 from which an instant messaging application is run, according to the preferred embodiment. Client computer system 300 includes CPU 301, main memory 302, various device adapters and interfaces 303-308, and communications bus 310. CPU 301 is a general-purpose programmable processor, executing instructions stored in memory 302; while a single CPU is shown in FIG. 3, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communications bus 310 supports transfer of data, commands and other information between different devices; while shown in simplified form as a single bus, it may be structured as multiple buses, and may be arranged in a hierarchical form. Display adapter supports video display 311, which is typically a cathode-ray tube display, although other display technologies may be used. Keyboard/pointer adapter 304 supports keyboard 312 and pointing device 313, depicted as a mouse, it being understood that other forms of input devices could be used. Storage adapter 305 supports one or more data storage devices 314, which are typically rotating magnetic hard disk drives, although other data storage devices could be used. Printer adapter 306 supports printer 315. Adapter 307 may support any of a variety of additional devices, such as CD-ROM drives, audio devices, etc. Network interface 308 provides a physical interface to the Internet. In a typical personal computer system, this interface often comprises a modem connected to a telephone line, through which an Internet access provider or on-line service provider is reached. However, many other types of interface are possible. For example, computer system 300 may be connected to a local mainframe computer system via a local area network using an Ethernet, Token Ring, or other protocol, the mainframe in turn being connected to the Internet. Alternatively, Internet access may be provided through cable TV, wireless, or other types of connection. Computer system 300 will typically be any of various models of single-user computer systems known as "personal computers". The representation of FIG. 3 is intended as an exemplary simplified representation, it being understood that many variations in system configuration are possible in addition to those mentioned here. Furthermore, a client requesting a web search in accordance with the present invention need not be a personal computer system, and may be a larger computer system, a notebook or laptop computer. Finally, such a client need not be a general-purpose computer system at all, but may be a special-purpose device for accessing the web, such as an Internet access box for a television set, or a portable wireless web accessing device.

Figure 4:
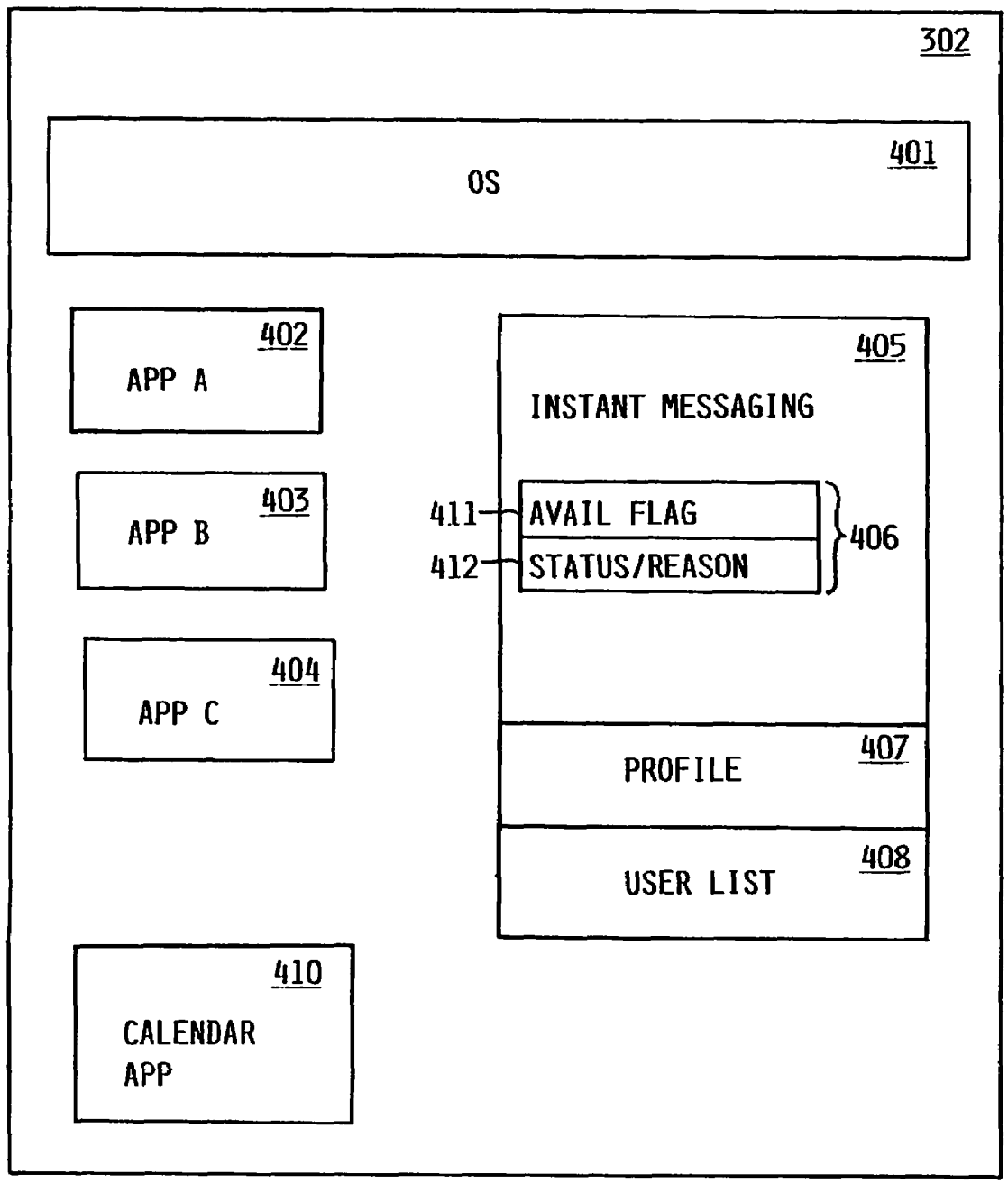
FIG. 4 is a conceptual illustration of the major software components of a client workstation computer system using an instant messaging application, in accordance with the preferred embodiment.

FIG. 4 is a conceptual illustration of the major software components of client workstation system 300 in memory 302. Operating system 401 provides various low-level software functions, such as device interfaces, management of memory pages, management of windowing interfaces, management of multiple tasks, etc. as is well-known in the art. Application software 402, 403, 404 enable the user to perform useful work on workstation 300. Applications 402, 403, 404 could be almost any of thousands of different types of applications, such as word processors, spreadsheets, code generation and compilation tools, database applications, schedulers, accounting applications, process tracking, etc. Typically, multiple applications will be present on a workstation, and a user may switch from one application to another in a multitasking environment, as is well known in the art.

Also resident in memory 302 is instant messaging client application 405. Instant messaging application supports the sending and receiving of instant messages to and from other users. Additionally, instant messaging application 405 functions to inform the user whether selected other users are currently available to receive instant messages (or for that matter, available to receive more traditional communications, such as telephone calls).

In order to support the determination of user availability, instant messaging application 405 provides a query function and a status function. The query function launches queries to instant messaging server 100 across network interface 105, for the purpose of determining the current availability of other users. User list 408 contains a list of electronic addresses of other users of interest. The query function may launch a blanket query of the server as to the status of all users on user list 408, or may inquire as to the status of particular users. Additionally, the query function may launch queries at some periodic interval specified by the user, or may launch queries on demand of the user.

The status function determines the current availability status of the user of workstation 300, and reports this status to server 100 across network interface 105, as more fully described herein. Current availability status is stored in status variables 406, which contain a flag field 411 indicating availability, and status field 412 indicating the reason for unavailability. Additionally, memory 402 contains instant messaging profile 407. Profile contains user-specified options for inferring availability for purposes of instant messaging, as explained further herein.

Memory 102 additionally contains calendar application 410. Calendar application 410 is an electronic calendar which stores and displays calendar information such as appointments, meetings, reminders, deadlines, plans, and the like. Calendar application 410 includes any necessary data files for storing required calendar information. This calendar information can be accessed by other application software using a defined application programming interface (API) to call an appropriate function in calendar application 410. As described more fully herein, instant messaging application 405 calls calendar application 410 uses the API to obtain calendar information, which is used to infer user availability.

While a certain number of applications, files, and other entities are shown, it will be understood that these are shown for purposes of illustration only, and that the actual number of such entities may vary. Additionally, while the software components of FIG. 4 are shown conceptually as residing in memory, it will be understood that in general the memory of a computer system will be too small to hold all programs and data simultaneously, and that information is typically stored in data storage 314, comprising one or more mass storage devices such as rotating magnetic disk drives, and that the information is paged into memory by the operating system as required.

Figure 5:
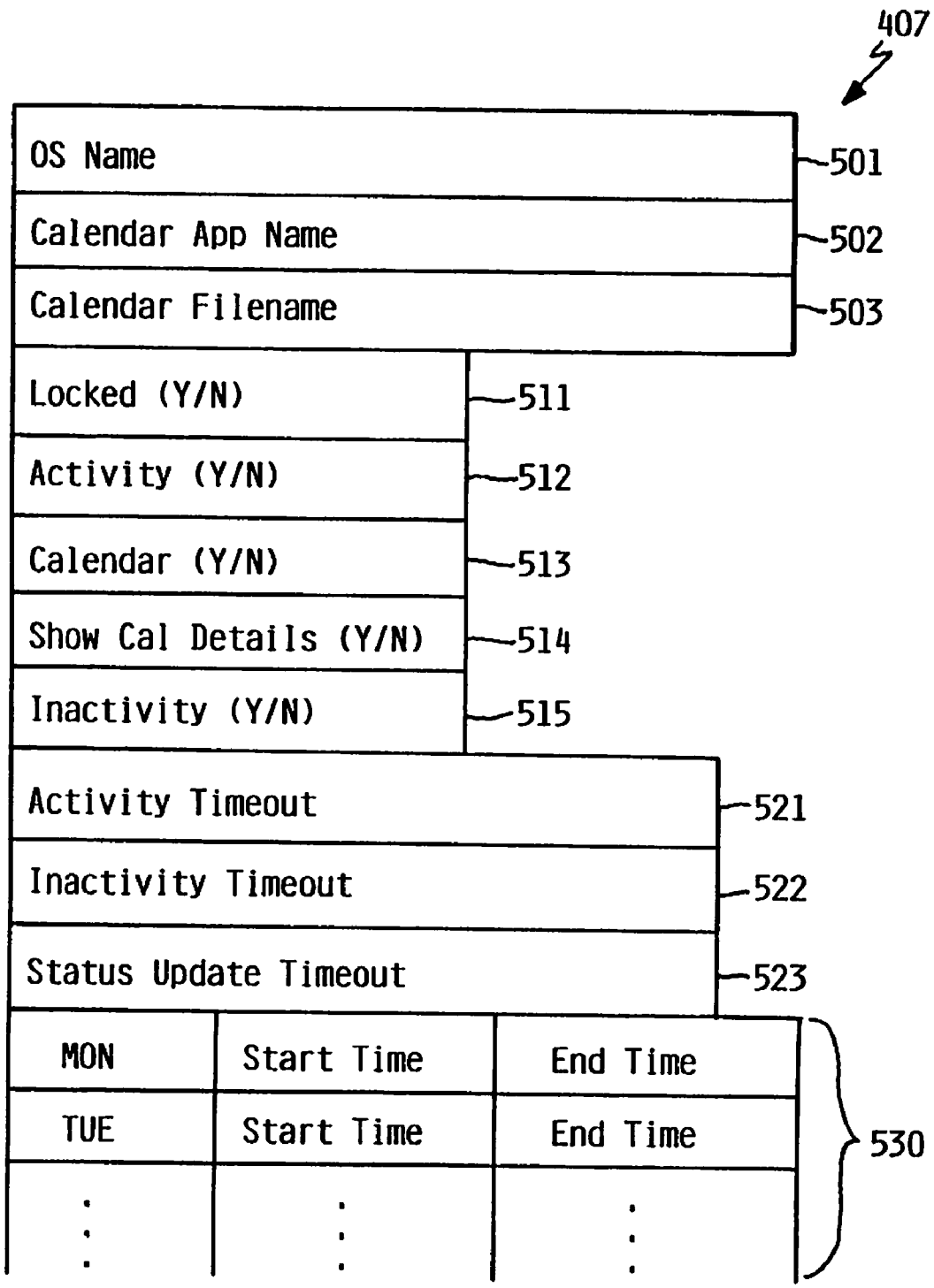
FIG. 5 illustrates the information maintained in the instant messaging profile on the client workstation, according to the preferred embodiment.

FIG. 5 illustrates the information maintained in instant messaging profile 407. OS name field 501 identifies the type of operating system 401 (e.g., Microsoft Windows™, AIX™, etc.), and is used by messaging application 405 to query the operating system regarding lockup state or time since last user activity. Calendar application name field 502 identifies the type of calendar application 410 (e.g., Lotus Organizer™, CorelCENTRAL™, etc.), and is used by messaging application to access calendar application 410 via an API. Calendar filename field 503 contains the name of the calendar file; many calendars applications support multiple calendar files (e.g., for multiple individuals), and field 503 gives the user the option of specifying a particular one. Where field 503 is blank, all calendar files will be searched for calendar information. Locked flag 511 is a flag indicating whether instant messaging application 405 should infer unavailability from the locked status of workstation 300. Activity flag 512 is a flag indicating whether instant messaging application 405 should infer availability from recent user input, i.e., input occurring within a time period prescribed by activity timeout period field 521. Calendar flag 513 is a flag indicating whether instant messaging application 405 should infer unavailability from entries in the user's calendar. Show calendar details flag 514 is a flag indicating whether instant messaging application 405 should send detailed information from the calendar to the instant messaging server 100 for propagation to other instant messaging users. Inactivity flag 515 is a flag indicating whether instant messaging application 405 should infer unavailability from lack of recent user input, i.e., lack of input occurring within a time period prescribed by inactivity timeout period field 522. Inactivity flag 515 should not be confused with activity flag 512; these activate two separate inferences based on different time intervals, as explained more fully herein. Status update interval 523 specifies a time interval for updating availability status in the instant messaging application 405. Normal start and end time array 530 contains the normal start time and normal end time of availability for each of the seven days of the week, and is used in conjunction with calendar information to infer unavailability during periods outside the normal hours of availability (e.g., the normal hours of work).

Profile 407 is an auxiliary file that is shipped to a user with the instant messaging application 405, and preferably initially contains default values which would be meaningful to the average user. E.g., flags 511-515 are set "yes" by default, activity timeout period 521 is set to 1 minute, inactivity timeout period 522 is set to 15 minutes, and status update interval is set to 5 minutes, while other fields are blank. Profile can be edited by the user to change any of the default values. Preferably, instant messaging application would include an appropriate editing tool to change the default values, or alternatively, the profile could be edited with a generic editor.

Figure 6:
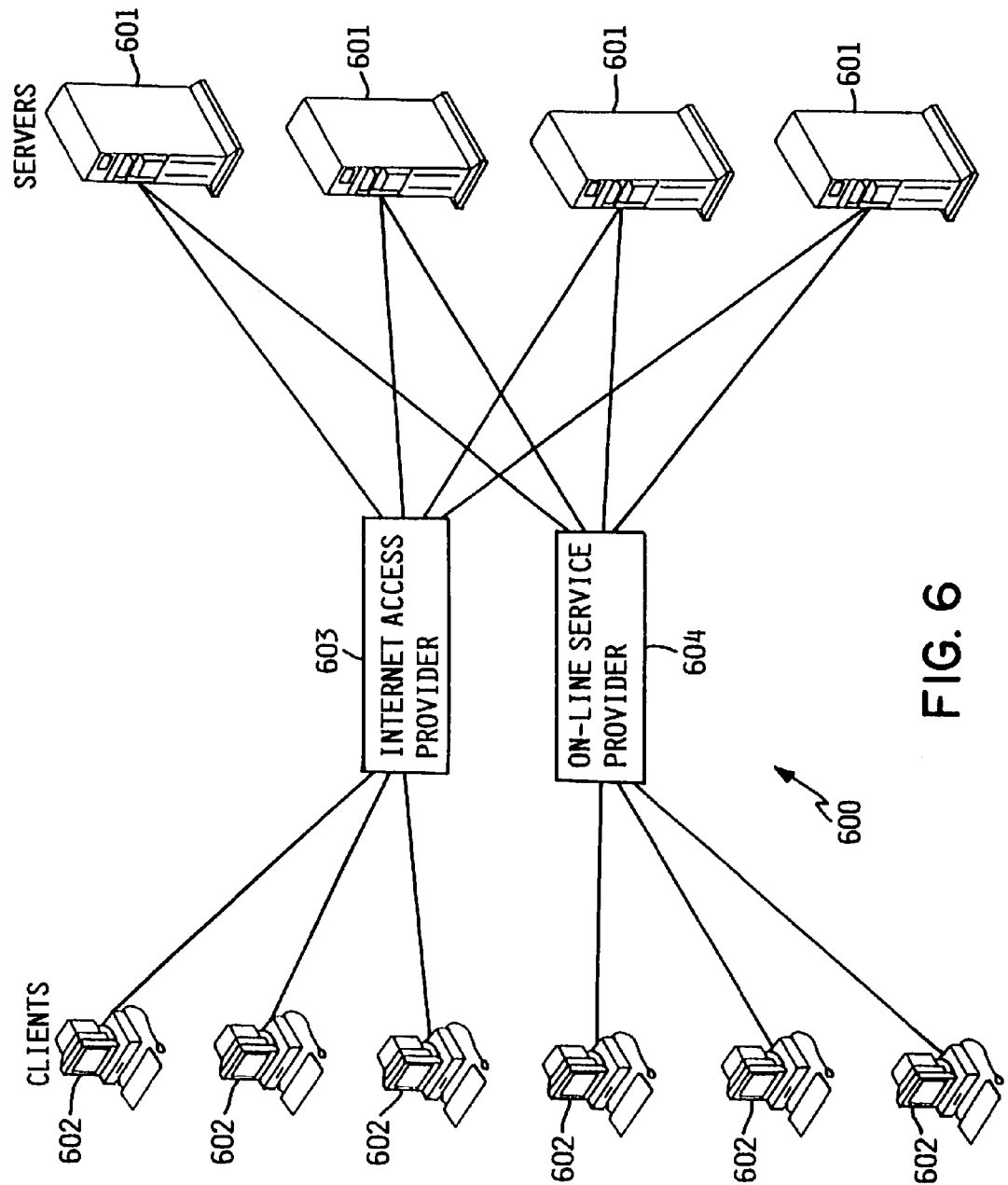
FIG. 6 is a simplified representation of a computer network such as the Internet, according to the preferred embodiment.

FIG. 6 is a simplified representation of a computer network 600. Computer network 600 is representative of the Internet, which can be described as a known computer network based on a client-server model. Conceptually, the Internet includes a large network of servers 601 (such as server 100) that are accessible by clients 602, typically computers such as computer system 300, through some private Internet access provider 603 or an on-line service provider 604. While various relatively direct paths are shown, it will be understood that FIG. 6 is a conceptual representation only, and that a computer network such as the Internet may in fact have a far more complex structure.

Figure 7:
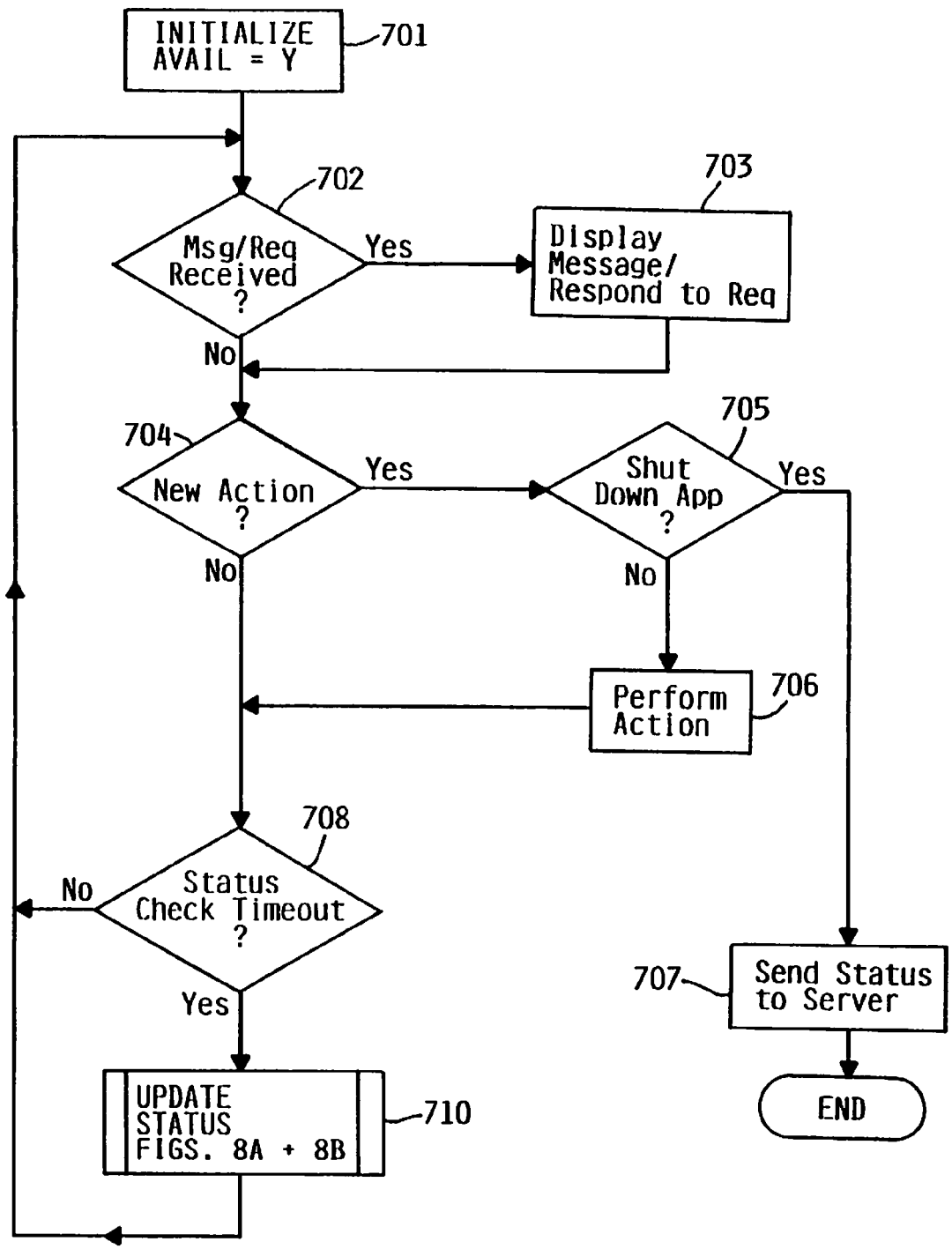
FIG. 7 is a high-level flowchart illustrating the operation of instant messaging software within the client workstation, according to the preferred embodiment.
Figures 1, 8A:
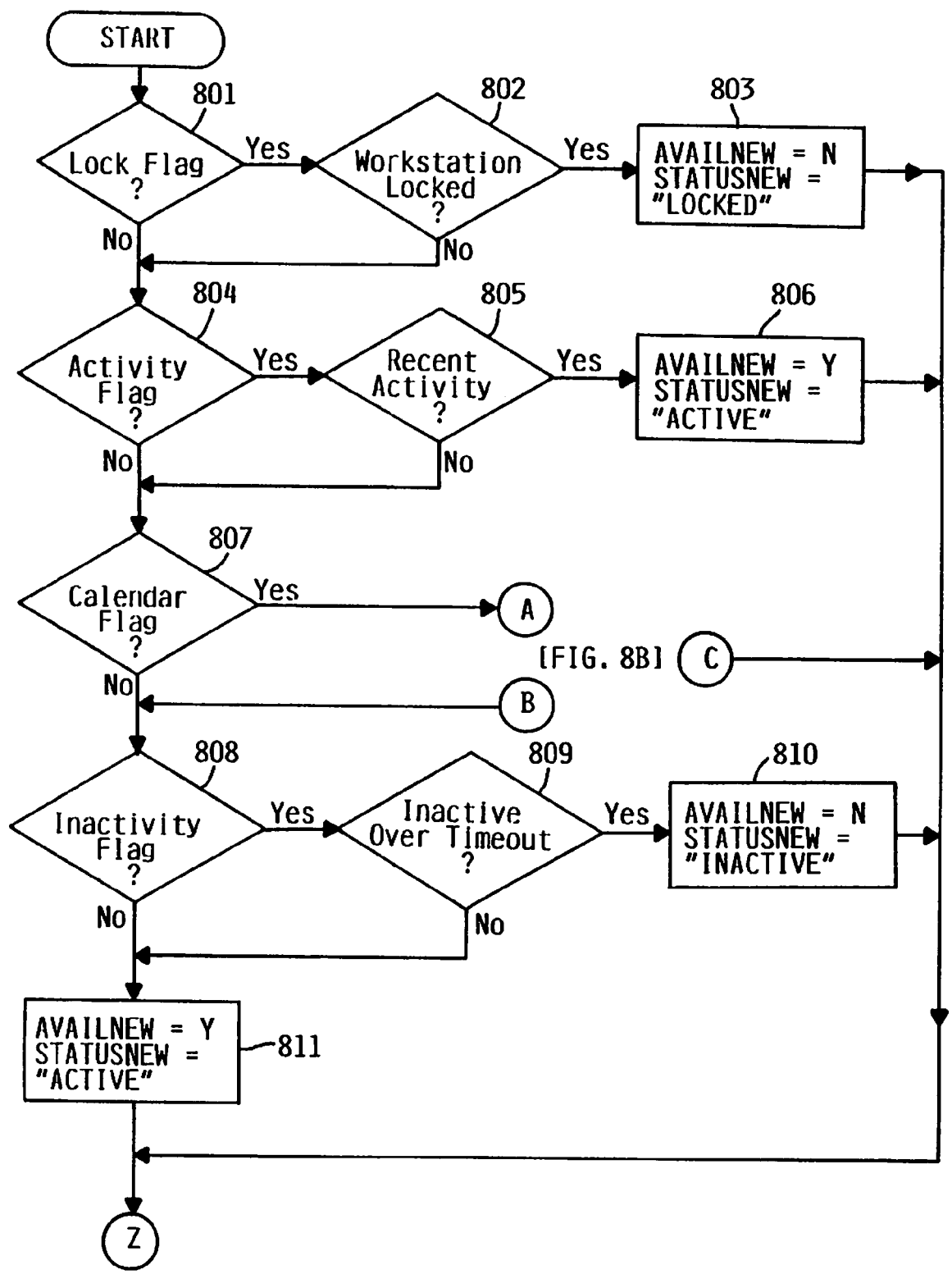
Figures 2, 8A:
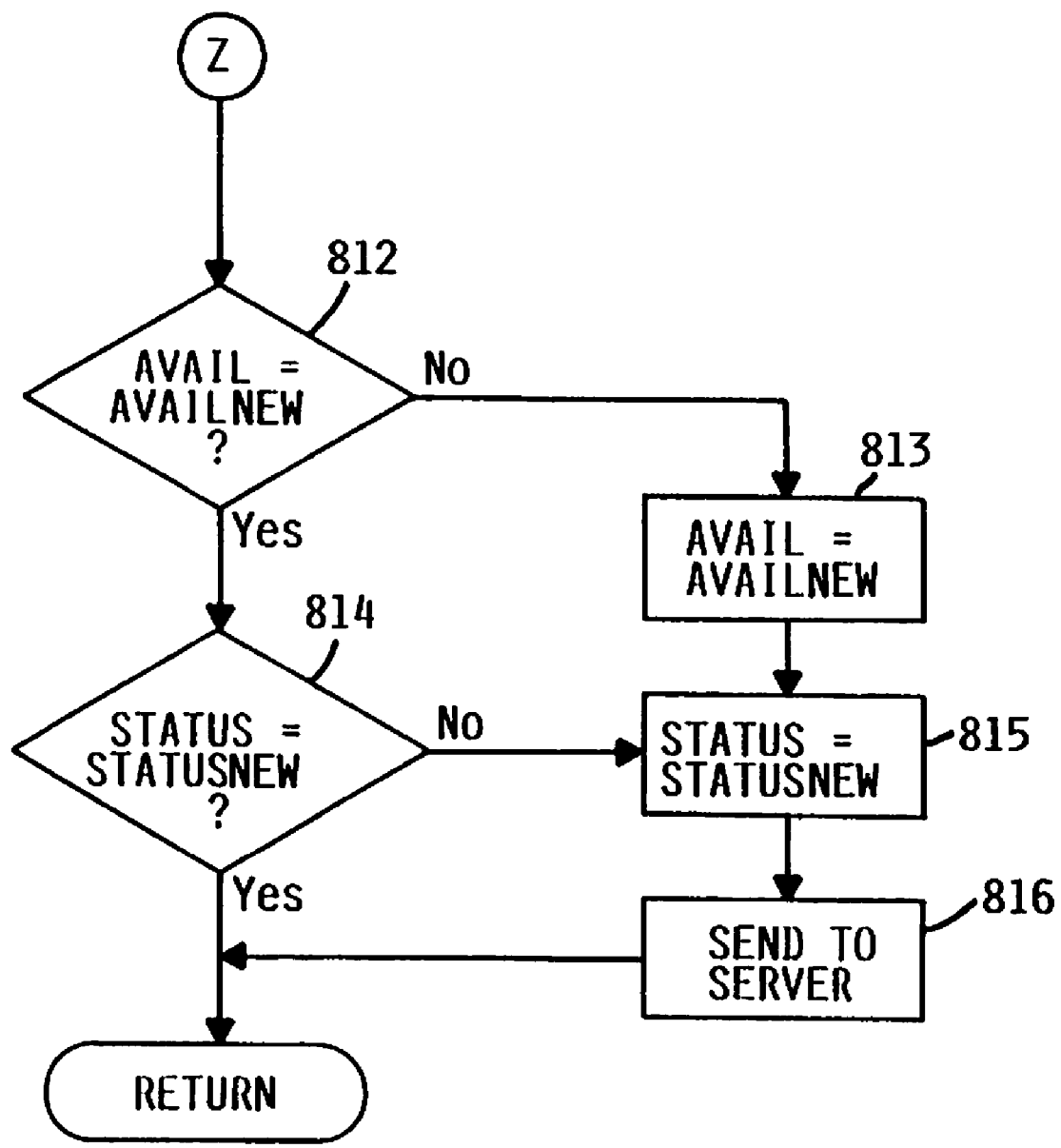
Figure 8B:
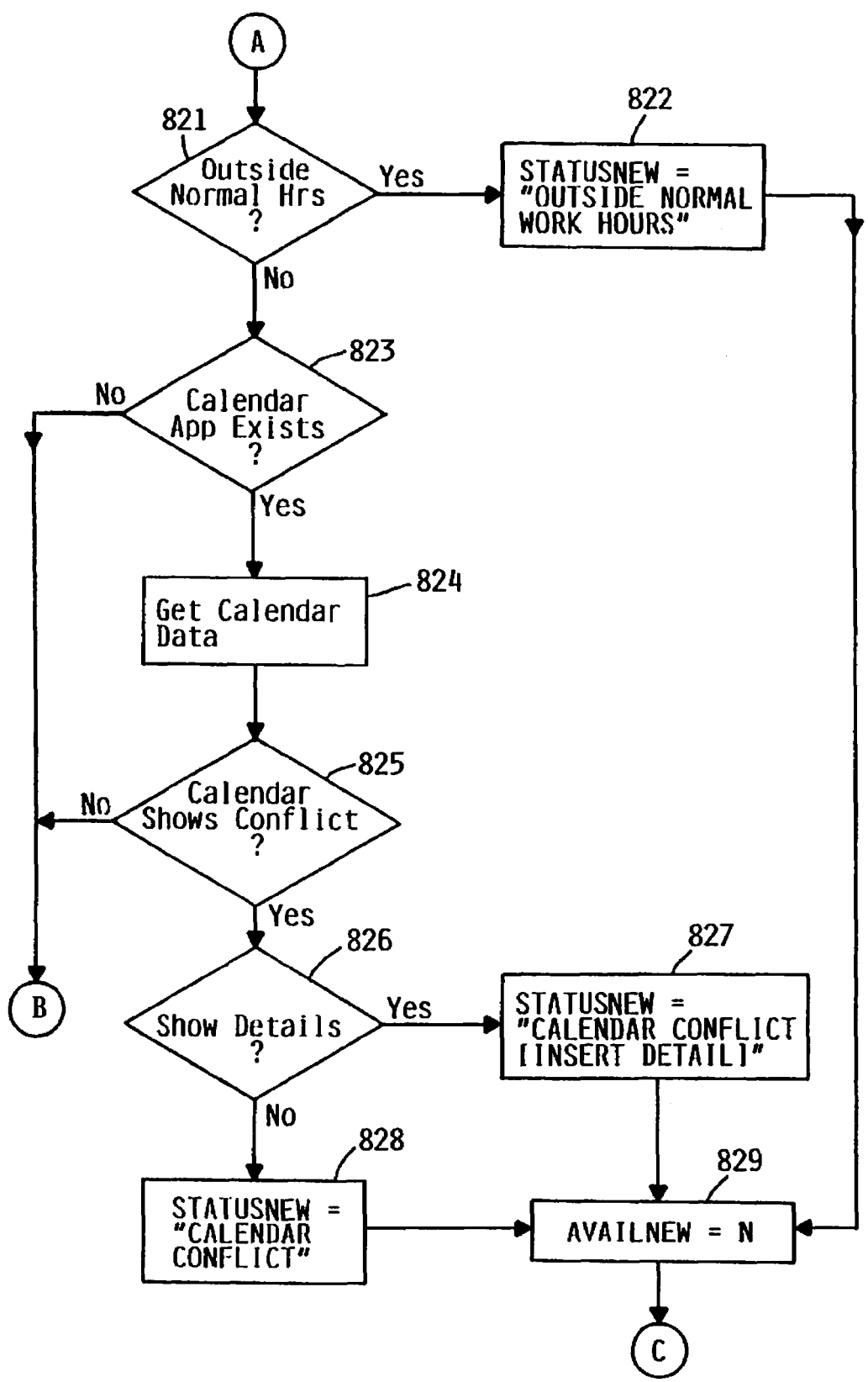

The operation of instant messaging in accordance with the preferred embodiment will now be described. FIGS. 7, 8A and 8B are high-level flow charts illustrating the operation of instant messaging software 405 within the client workstation. Instant messaging application is invoked by the user, causing the application to initialize (step 701). Among the initialization steps, status variables 406 are initialized, i.e., current availability 411 is set to "yes", and status/reason 412 is set to "active".

Instant messaging 405 then enters a loop consisting of steps 702, 704 and 708, which execute in the background as the user performs other useful work. Instant messaging application 405 checks for any communication received from instant messaging server 100 over the Internet (step 702). If a communication is received, appropriate action is taken (step 703). A communication from server 100 may be a message from another user of instant messaging, currently logged on, in which case the response at step 703 will be to call the user's attention to the fact that an instant message was received. This may mean displaying the message on a pop-up window, or could take some other form, such as an audible notification, a blinking icon, etc. If the communication from the server is a request for the availability status of the user of workstation 300, instant messaging application 405 responds at step 703 by transmitting the contents of status variables 406 to server 100. In other cases (e.g., error messages, acknowledgments, etc.), action is taken appropriate to the type of communication received.

Instant messaging further checks for any new action originating from client 300 (step 704). A new action could be initiated as a result of user input, or could be something that instant messaging application 405 does automatically (other than update status, as explained below with respect to step 708). For example, the user may wish to send an instant message, to inquire regarding the availability of other users, or to perform some other action. Additionally, instant messaging application 405 may be configured to automatically perform some action, such as poll the server 100 at periodic intervals regarding the current availability of other users on user list 408. If the requested new action is to shut down the instant messaging application 405 (step 705), the instant messaging application sends a message to server 100 to the effect that it is shutting down (i.e., user is no longer available), and then performs any actions necessary to shut itself down (step 707). If the new action is some action other than shut down, the action is performed (step 706), after which the instant messaging application returns to the loop.

Instant messaging application 405 periodically checks a timer since status was last updated (step 708). The timer is reset to the value specified in status update timeout field 523 of profile 407 every time the timer times out. If the timer has not timed out, control returns to step 702 and the loop is re-executed. If the timer has timed out, the current status of the user of workstation 300 is updated, as represented by step 710 in FIG. 7, and described in further detail below and shown in FIGS. 8A and 8B.

Referring to FIGS. 8A and 8B, when status is check, instant messaging application 405 first checks lock flag 511 from profile 407, which activates checking for a locked condition (step 801). If lock flag is not set, checking for locked condition is by-passed, and step 804 is executed next. If the lock flag is set, messaging application 405 makes a standard call to operating system 401 to determine whether workstation 300 is in a locked condition (step 802). If not, control proceeds to step 804. If the workstation is locked, it is assumed that the user is not available, and further checks are unnecessary. Therefore, variable AVAILNEW, representing the new availability status which will eventually replace the value in field 411, is set to "N", and STATUSNEW (the new value of field 412) is set to "Locked" (step 803). Since the status field 412 is intended to convey further information about a user's availability, it would optionally be possible to include further information of potential utility in this field, such as the length of time that the workstation has been in a locked state. After executing step 803, messaging application continues to step 812.

If the locked flag is not set or the workstation is not locked, messaging application 405 proceeds to check activity flag 512 from profile 407. If activity flag 512 is not set, the check for recent activity is by-passed, and step 807 is executed next. If activity flag 512 is set, messaging application 405 makes a standard call to operating system 401 to determine whether there has been any recent user activity such as keyboard input, mouse input, etc (step 805). Specifically, messaging application 405 determines whether there has been any user input within the time period specified by activity timeout field 521 of profile 407. The reason for this check is that it is presumed that very recent activity (e.g., within the last minute or two) is a very strong indicator that the user is available, and should probably override any information in the electronic calendar which indicates otherwise. For this reason, the time period specified in timeout field 521 should be quite short, preferably much shorter than the time period specified in timeout field 522 wherein unavailability is presumed after a fairly long period of inactivity. If there has been no activity within the period specified by timeout 521, the "no" branch is taken from step 805, and the application continues to step 807. If there has been very recent activity, AVAILNEW is set to "Y", STATUSNEW is set to "Active" (step 806), and the application continues to step 812.

If the lock and activity checks are negative, messaging application 405 then checks calendar flag 513 from profile 407 (step 807). If calendar flag 513 is not set, the calendar check is by-passed, and the application proceeds directly to step 808. If the calendar flag is set, the application compares the current day and time with the normal start and end times from normal hours array 530 of profile 407 (step 821). If the current day/time is outside normal hours of availability (e.g., normal hours of work) specified in array 530, the STATUSNEW is set to "Outside normal work hours" or some similar message (step 822). STATUSNEW may optionally include additional information, such as what the user's normal hours are, as obtained from array 530. The messaging application then sets AVAILNEW="N" (step 829), and continues to step 812.

If the current day/time is within the normal hours of availability, messaging application 405 checks calendar application name field 502 of profile 407 for the existence of a calendar application (step 823). If no calendar application exists, the messaging application is done checking the calendar, and continues to step 808. If there is a calendar application specified, messaging application 405 calls the calendar application 410, passing the calendar filename specified in filename field 503 of profile 407, to obtain calendar data from the calendar application (step 824). If the calendar shows no conflict, the calendar check is complete, and the messaging application continues to step 808. If the calendar shows a conflict (e.g., a meeting at the current day/time), messaging application checks show calendar details flag 514 from profile 407 to determine how much information should be passed (step 826). If flag 514 is not set, STATUSNEW is set to some minimal amount of information, such as "Calendar conflict" (step 828). If flag 514 is set, STATUSNEW is set to contain additional detail from the calendar, such as the time, place and purpose of the conflicting event. Such additional information is potentially of use to other users of instant messaging, e.g., to locate the user in question if there is some urgency, or to get a general idea of when the user may again be available, etc. Of course, it is possible that a user will not wish to share such information, and for that reason the user has the option of suppressing calendar details with flag 514. Whether or not flag 514 is set, AVAILNEW is set to "N" (step 829), and the messaging application proceeds to step 812.

If no calendar check was performed or if the calendar check revealed no conflict, the messaging application checks inactivity flag 515 from profile 407 (step 808). If inactivity flag 515 is not set, the inactivity check is by-passed, and messaging application 405 continues to step 811. If inactivity flag 515 is set, messaging application determines whether there has been any user input within the timeout period specified in inactivity timeout field 522 of profile 407 (step 809). If the period of inactivity does not exceed the timeout, the messaging application proceeds to step 811. If the period of inactivity exceeds the timeout specified in field 522, AVAILNEW is set to "N", STATUSNEW is set to "Inactive", or some similar message (step 810). It would optionally be possible to specify the length of time the user has been inactive in STATUSNEW, since this information is of potential utility to other users of instant messaging. Instant messaging then continues to step 812.

If all of the various status checks are either by-passed or fail to trigger any status inference, it is assumed that the user is available, and AVAILNEW is set to "Y", STATUSNEW is set to "Active" (step 811). The messaging application then proceeds to step 812.

When the new status is essentially determined, the messaging application compares AVAILNEW (the new availability status) with AVAIL (the previous availability) (step 812), and branches to step 813 if there is any change. If there is no change, it compares STATUSNEW (the new reason) with STATUS (the previous reason) (step 814), and if there is a change branches to step 815. If neither has changed, the messaging application if finished with status checking, and returns (step 702 is executed next). If either has changed, AVAIL is updated (step 813) and/or STATUS is updated (step 815) as appropriate, and the updated AVAIL and STATUS are transmitted to server 100 over the Internet (step 816). The messaging application is then finished with status checking, and returns (step 702 is executed next).

Figure 9:
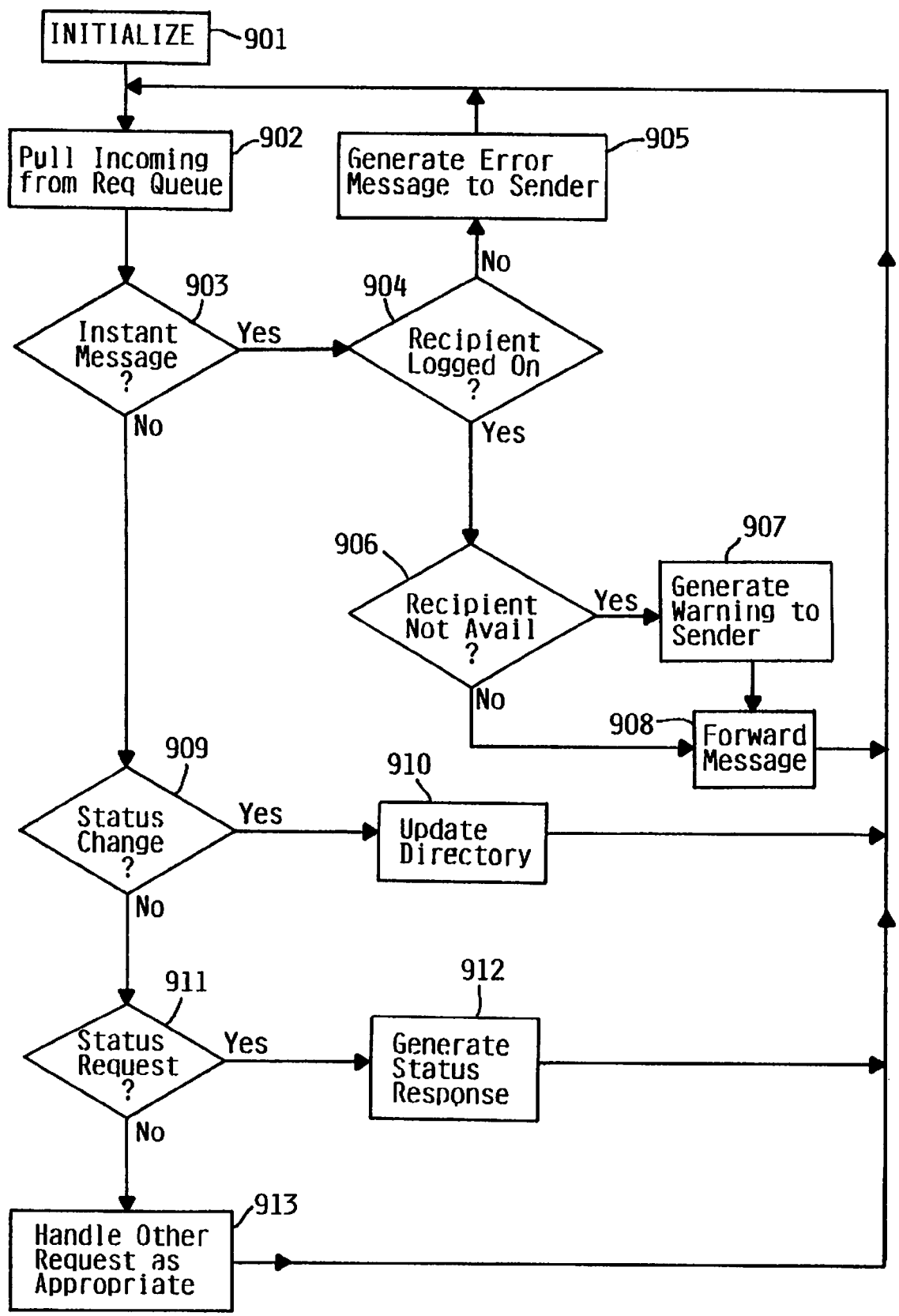
FIG. 9 is a high-level flowchart illustrating the operation of instant messaging software within the instant messaging server, according to the preferred embodiment.

FIG. 9 is a flowchart illustrating at a high level the operation of server instant messaging application 202. The application is initialized once (step 901), and then remains in a loop wherein is services incoming requests on the request queue 204. An incoming request may have been generated automatically by the instant messaging application 405 running on the client 300, or may have been something the user a client workstation 300 manually input to the system (such as an instant message).

As shown, at step 902, a request is pulled from the request queue 204. Any of various known queue management algorithms may be used, such as FIFO. If the request is an instant message intended for another user attached to the network (step 903), instant messaging application 202 checks directory 203 to determine whether the intended recipient is currently logged on (step 904). If the recipient is not logged on, an error message is generated and placed on response queue 206 for transmission to the sender (step 905). If the intended recipient is logged on, instant messaging application 202 checks directory 203 for availability information, i.e., information from status variables 406 which were forwarded from the client workstation and stored in directory 203. If the intended recipient is indicated to be "unavailable", instant messaging application 202 generates a warning message warning the sender of probably unavailability, and places this message on the response queue 206 for transmission to the sender (step 907). Whether or not the intended recipient is deemed "unavailable", the instant messaging application retrieves physical accessing information of the recipient from directory 203, and places the message on the response queue for forwarding to the recipient (step 908). It then services the next request at step 902.

If the incoming request is not an instant message, instant messaging application 202 proceeds to step 909. If the incoming request is a status change (step 909), information in directory 203 is updated to reflect the status change (step 910), and the next request is serviced (step 902). A status change is a change to availability status variables 406 which is reported by a client workstation using instant messaging. If the incoming request is a request for status, i.e., a request from a first client for availability status information concerning one or more other clients (step 911), instant messaging application 202 checks status in directory 203 and generates responsive information, placing this on the response queue for transmission to the requesting client (step 912). It then services the next request (step 902). In the case of all other types of incoming requests, the instant messaging application 202 takes whatever action is appropriate to handle the request (step 913), and returns to service the next request (step 902).

In the preferred embodiment described above, processing is done in a distributed manner on the Internet, with each user having a copy of the instant messaging software 405 on his or her own workstation 300, and certain status information being maintained in an Internet server 100. However, it will be appreciated that the present invention could be implemented in many different multi-user computing environments, and in particular, need not necessarily be implemented using the Internet. For example, the invention could be implemented in a mainframe based computing environment, in which multiple interactive user terminals (which may or may not be "intelligent" workstations) are attached to a host computer system. In such cases, instant messaging software 405, and/or calendar application 410, and associated files may reside in the host computer system, or may reside in the user terminals, or some functions may be in the host, while others are in the user terminals. Alternatively, the computing environment could employ different client-server models, in which some or all of the functions are performed, and associated files maintained, on one or more server computer systems. E.g., calendars could be maintained on separate server systems. Additionally, there are alternative ways in which the functions of instant messaging may be implemented. For example, either server or client might respond to polls concerning availability and messages, as opposed to initiating direct action. Many additional variations in hardware and network configuration, or in allocation of function between user workstations and central hosts or servers, are possible, and the present invention should not be construed to be limited to any particular client-server or host-terminal architecture.

In the preferred embodiment described above, calendar data is obtained from a separate calendar data application, and to a lesser extent, from the start and end time array 530 of profile 407. However, calendar type information may be stored differently. For example, the instant messaging application may have its own internal calendar function (more sophisticated than array 530), which stores times and dates of meetings and other appointments. Alternatively, array 530 may be omitted, particularly if the calendar application contains substitute data of this type.

It would optionally be possible for an instant messaging application consistent with the invention herein to generate its own data about user schedules as so forth automatically, by collecting historical data regarding days and times of use, and inferring likelihood of the user availability or unavailability from such historical data.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as data storage device 104, and in FIG. 3 as data storage device 314.

Although a specific embodiment of the invention has been disclosed along with certain alternatives, it will be recognized by those skilled in the art that additional variations in form and detail may be made within the scope of the following claims:

What is claimed is:

1. An instant messaging computer program product operating in a first computer system attached to a network of computer systems, said computer program product including a plurality of processor executable instructions recorded on hardware computer-readable storage media, wherein said instructions comprise:

an incoming message function, said incoming message function receiving incoming instant messages from users of other computer systems attached to said network, said other computer systems attached to said network executing respective instant messaging applications, said incoming message function further informing a user of said first computer system of receipt of said incoming instant messages;

an outgoing message function, said outgoing message function sending outgoing instant messages to said respective instant messaging applications executing in said other computer systems attached to said network; and an availability reporting function, said availability reporting function reporting availability status of said user to one or more said respective instant messaging applications executing in said other computer systems attached to said network, wherein said availability reporting function automatically infers whether said user is available by calling a calendar application to access calendar data concerning said user stored in at least one calendar data file maintained by said calendar application, said calendar application being an application independent of said instant messaging application.

2. The instant messaging computer program product of claim 1, wherein said availability reporting function further automatically infers whether said user is available from at least one indicium of availability from the set consisting of: (a) whether the first computer has received any input from the user within a predetermined time period; and (b) whether the first computer is in a locked state.

3. The instant messaging computer program product of claim 1, wherein said availability status reported by said availability reporting function includes a reason for inferring unavailability.

4. The instant messaging computer program product of claim 1, wherein said calendar data includes normal hours of availability.

5. The instant messaging computer program product of claim 1, wherein said calendar data includes events.

6. The instant messaging computer program product of claim 1, wherein said network is the Internet, and wherein:
   said incoming instant messages are received from an Internet server;
   said outgoing instant messages are sent to said Internet server; and
   said availability status is reported to said Internet server.

7. A computer system providing an instant messaging function, comprising:
   a hardware programmable processor;
   a network interface connecting said computer system to a network of computer systems;
   a display for displaying information to a user of said computer system;
   an incoming message function embodied as instructions executable on said programmable processor and recorded on hardware computer-readable storage media, said incoming message function receiving incoming instant messages from users of other computer systems attached to said network, said other computer systems attached to said network executing respective instant messaging applications, said incoming message function further displaying said incoming messages on said display;
   an outgoing message function embodied as instructions executable on said programmable processor, and recorded on hardware computer-readable storage media, said outgoing message function sending outgoing instant messages to said respective instant messaging applications executing in said other computer systems attached to said network; and
   an availability reporting function embodied as instructions executable on said programmable processor, and recorded on hardware computer-readable storage media, said availability reporting function reporting availability status of a first user to a second user, said first user being a user of said computer system, said second user being a user of an instant messaging application executing in a second computer system attached to said network, wherein said availability reporting function automatically infers whether said first user is available by calling a calendar application to access calendar data concerning said first user stored in at least one calendar data file maintained by said calendar application, said calendar application being an application independent of said instant messaging application.

8. The computer system of claim 7, wherein said network is the Internet, and wherein:
   said incoming instant messages are received from an Internet server;
   said outgoing instant messages are sent to said Internet server; and
   said availability status is reported to said Internet server.

* * * * *